United States Patent [19]
Priem et al.

[11] Patent Number: 5,237,650
[45] Date of Patent: Aug. 17, 1993

[54] METHOD AND APPARATUS FOR SPATIAL ANTI-ALIASED DEPTH CUEING

[75] Inventors: Curtis Priem, Freemont; Chris Malachowsky, Santa Clara; Peter Ross, Palo Alto, all of Calif.

[73] Assignee: Sun Microsystems, Inc., Mountain View, Calif.

[21] Appl. No.: 814,189

[22] Filed: Dec. 20, 1991

Related U.S. Application Data

[63] Continuation of Ser. No. 385,555, Jul. 26, 1989, abandoned.

[51] Int. Cl.$^5$ ............................................. G06F 15/68
[52] U.S. Cl. .................................. 395/143; 395/141; 395/119; 395/125
[58] Field of Search ............... 340/747, 750, 724, 728, 340/731; 395/143, 141, 119, 125

[56] References Cited

U.S. PATENT DOCUMENTS

| | | | |
|---|---|---|---|
| 4,922,544 | 5/1990 | Stansfield et al. | 381/56 |
| 4,924,415 | 5/1990 | Winser | 364/522 |
| 4,940,972 | 7/1990 | Mouchot et al. | 340/747 |
| 4,951,232 | 8/1990 | Hannah | 364/522 |
| 4,952,922 | 8/1990 | Griffin et al. | 340/729 |

Primary Examiner—Phu K. Nguyen
Attorney, Agent, or Firm—Blakely Sokoloff Taylor & Zafman

[57] ABSTRACT

A computer graphics system comprising apparatus for drawing quadrilateral images on an output display when furnished the vertices of the quadrilateral, apparatus for providing width values for each end of a line to be displayed on an output display which width values are indirectly related to the depth of the ends of the line from the viewer, and apparatus for utilizing the width values to determine vertices of a line to be drawn by the apparatus for drawing a quadrilateral image.

20 Claims, 7 Drawing Sheets

METHOD AND APPARATUS FOR SPATIAL ANTI-ALIASED DEPTH CUEING

This is a continuation of application Ser. No. 07/385,555 filed Jul. 26, 1989 now abandoned.

BACKGROUND OF THE INVENTION

1. Field of the Invention

This invention relates to computer graphics systems and, more particularly, to arrangements for cueing the viewer that images presented on computer displays involve a third dimension.

2. History of the Prior Art

In presenting three dimensional representations of objects on two dimensional output displays, some means must be used for indicating the existence of the third dimension to the viewer. Various methods of accomplishing this result have evolved from standard drafting techniques. An example of this is perspective drawing in which parallel straight lines defining an object converge as the object recedes from view.

Certain other techniques have developed because of the peculiarities of the computer display. For example, in a bit-mapped computer output display which is presented on a cathode ray tube (CRT), a method used to indicate or cue the viewer to the different depths of portions of objects is to vary the intensity of the bits defining the object as the depth of the portion of the object increases. Thus, for a line running from the viewer's position to infinity, the closest location of the line is given the fullest intensity and the farthest location a zero intensity. The fading of the line in intensity provides the same effect as that given by images as they extend progressively further from the viewer. This technique enhances the feeling of depth of the line on the output display.

The prior art method of accomplishing this effect requires that each pixel of a line having a depth dimension have a different intensity value from a maximum to zero. In actual systems of the prior art, any individual line having a depth dimension is drawn by dividing the line length by the number of pixels and calculating an intensity value for each adjoining pixel of which the line is composed. Thereafter, each individual pixel is written to the output display, a single pixel at a time. In color systems in which the color of the line varies from one end to the other, the circuitry of such systems must calculate intensities for each of the colors red, green, and blue separately, each from zero to one hundred percent intensity. The prior art arrangements for accomplishing this form of depth cueing for each pixel require a separate calculation engine for each of the colors. All of these operations are very time consuming.

In improving computer systems, the emphasis has been on improving the speed of operation of such systems. This is especially true of systems using bit-mapped displays where the graphics output is usually the point of the system which limits its speed. Consequently, providing depth cueing in three dimensional bit-mapped graphics output systems has been speed limiting for the system.

Moreover, certain computer graphics systems utilize a technique called anti-aliasing for improving the apparent rendering of a line on a display. In such a technique, various pixels defining a line are rendered at different intensities to remove the sharp jagged edges along the sides of the line. Antialiasing is a technique well known in the art and is described, for example, in "The Aliasing Problem in Computer-Synthesized Shaded Images," Franklin Crow, March 1976, UTEC-CSC-76-015, ARPA Report. In such systems, providing depth cueing is not the straight forward process of varying line intensity because line intensity variations are already a part of the system for providing the anti-aliasing effect.

It is, therefore, an object of the present invention to improve the speed of computer graphics systems.

It is another object of the present invention to provide an extremely rapid means of providing depth cueing in a computer graphics system.

An additional object of this invention is to provide a new technique for providing depth cueing in a three dimensional computer graphics system.

Yet another object of this invention is to provide a system capable of both anti-aliasing and depth cueing.

SUMMARY OF THE INVENTION

These and other objects of the invention are realized in a computer graphics system which comprises a graphics engine for drawing quadrilateral images on an output display when furnished the vertices of the quadrilateral, translation means for providing width values for each end of a line to be displayed on an output display which width values are indirectly related to the depth of the ends of the line from the viewer of the display, and means for utilizing the width values to determine vertices of a line to be drawn by the means for drawing a quadrilateral image.

These and other objects and features of the invention will become apparent to those skilled in the art by reference to the following detailed description taken together with the several figures of the drawing in which like elements have been referred to by like designations throughout the several views.

NOTATION AND NOMENCLATURE

Figure 1:
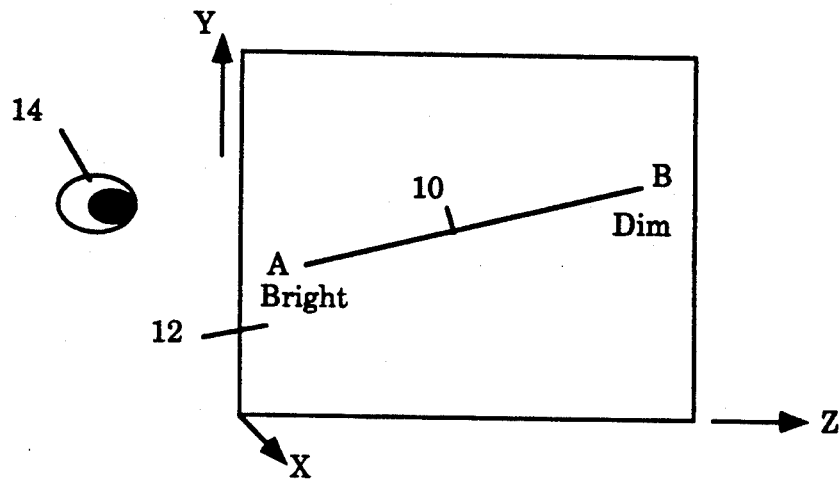
FIG. 1 is a side view illustrating a viewer's perspective of a three dimensional line.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DESCRIPTION OF THE PREFERRED EMBODIMENT

As described above, in presenting three dimensional representations on two dimensional output displays, some means must be used for indicating the third dimension to the viewer. One technique which has developed for a bit-mapped computer output display to indicate or cue the viewer to the different depths of portions of a line (or other object) is to vary the intensity of the bits making up a line as the depth of the line increases. The fading of the line in intensity gives the same effect as is given by images as they recede progressively further from the viewer. This effect enhances the feeling of depth.

The manner in which this technique of varying the intensity of a line to give a depth cue was practiced by the prior art was by providing the fullest intensity at the closest location of a line and the least intensity at the location farthest from the eye; those points lying on the line between the beginning and ends were given intensity values varying linearly between the intensities of the two end points.

FIG. 1 illustrates a line 10 lying in a three dimensional cube 12 of space. The cube 12 is provided with a Y axis, an X axis, and a Z axis to indicate the three dimensions of space in a conventional manner. The eye 14 of a viewer is also shown. In FIG. 1, an endpoint A of the line 10 nearest the eye 14 of the viewer is indicated to be bright; and an endpoint B farthest from the viewer is indicated to be dim. In fact, the endpoint B is given a color to blend with the background color of the display in most prior art arrangements. In this manner, the line 10 appears to disappear into the background. In this specification, the words "bright" and "dim" are used to indicate the apparent intensity of the pixels describing the points, whatever their actual color.

The method of accomplishing the effect described in a system using a bit-mapped output display requires that each pixel describing the line between the points A and B have a different intensity value linearly varying from a maximum to zero. In actual systems, the line is drawn by dividing the line length by the number of pixels in the line and calculating a linearly changing intensity value for each pixel.

Figure 2:
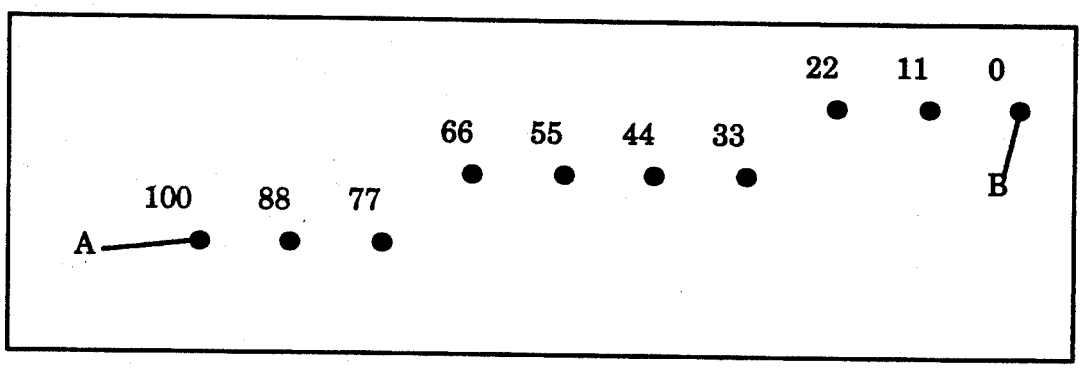
FIG. 2 is a view indicating the manner in which the prior art describes a three dimensional line on a bit-mapped computer display.

FIG. 2 illustrates the actual bits of a short line 10 such as that shown in FIG. 1 with approximate percentage values applied to the bit positions from the brightest point at A (100%) to the least bright point B (0%).

In general, most individual lines are displayed with but a single color. However, the presentation of depth cueing is complicated in graphics displays capable of rendering a line which changes in color from one end to the other. For a system to handle a situation in which a line of varying color also varies in depth, the circuitry of the system must calculate intensities for each of the colors red, green, and blue separately, each between zero and one hundred percent intensity. Such an operation is extremely time consuming which is one of the reasons prior art computer graphics displays are so slow. The prior art requires separate calculation engines to determine the colors for each pixel, and each line must be drawn a single pixel at a time.

As computer systems have improved, the emphasis at each stage has been on improving the speed of operation of such systems. This is especially true of computer systems using bit-mapped displays where the graphics output is slowest and thus the limiting point of the system. Consequently, providing depth cueing in three dimensional bit-mapped graphics output systems has been speed limiting for the system.

Figure 3A:
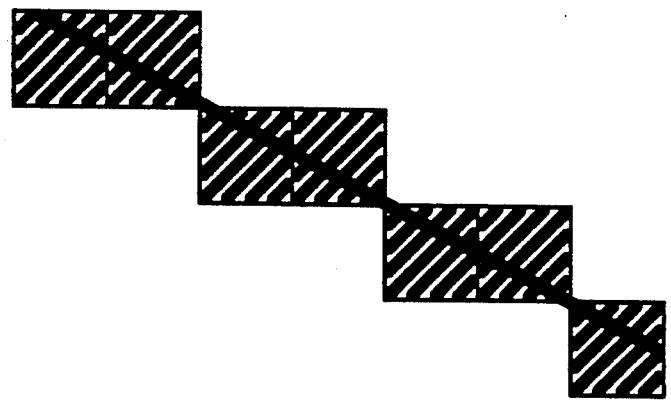
FIG. 3(a) is a view illustrating a greatly enlarged line described on a bit-mapped computer display using normal rendering techniques.
Figure 3B:
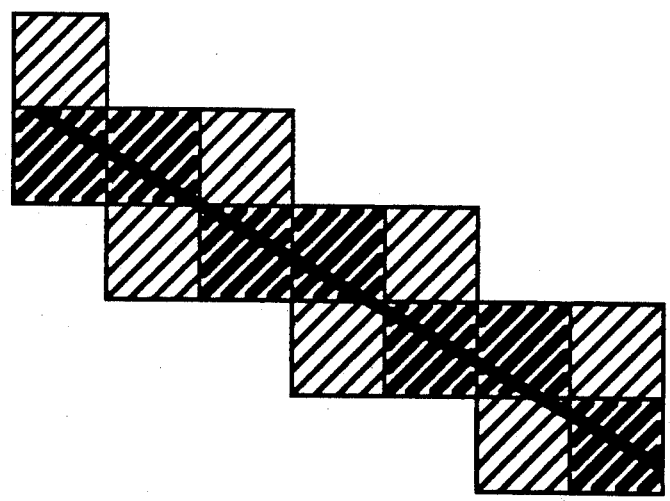
FIG. 3(b) is a view illustrating a greatly enlarged line described on a bit-mapped computer display using anti-aliasing rendering techniques.

Depth cueing is just one of the desirable features which may be implemented in computer systems. Anti-aliasing is another such desirable feature. FIG. 3(a) illustrates a greatly enlarged view of a normal line segment 20 as presented on a computer output display. Each block 24–30 represents a pixel presented on the display. As is obvious in the close up view illustrated in FIG. 3(a), the pixels which are used to approximate the points on an ideal line rendered on a computer display produce jagged edges which are perceivable to the eye. FIG. 3(b) shows a line which has been treated utilizing anti-aliasing techniques. In FIG. 3(b), the line 32 is represented by a larger number of pixels. In fact, each of the single points of the line 32 is comprised of two pixels of varying gray shades. When viewed from a distance, this presents the appearance to the eye of a much smoother line, one closer to the ideal. As may seen, anti-aliasing is a technique for shading the pixels representing an image so that the edges of the image do not present a jagged appearance. The application of the anti-aliasing technique described above usually requires separate complicated circuitry for determining the particular gray shades for each of the pixels in order to provide a rendering which reduces the jagged appearance of the image on the output display. This is also a time consuming operation.

It is desirable to provide depth cueing in computer systems of all types. For example, it is desirable to provide depth cueing in systems which also provide anti-aliasing of images. At times the two techniques would appear to interfere with each other for both prior art implementations attempt to utilize the varying intensities of the pixels on a computer output display to accomplish their desirable results.

U.S. patent application Ser. No. 07/258,183, entitled ANTI-ALIASING RASTER OPERATIONS, Priem, Webber, and Malachowsky, filed Oct. 14, 1988, discloses a graphics display system which includes a unique arrangement for implementing the anti-aliasing technique by combining circuitry utilized for other functions to provide anti-aliasing in a much simpler, more rapid, and less costly manner.

Figure 4:
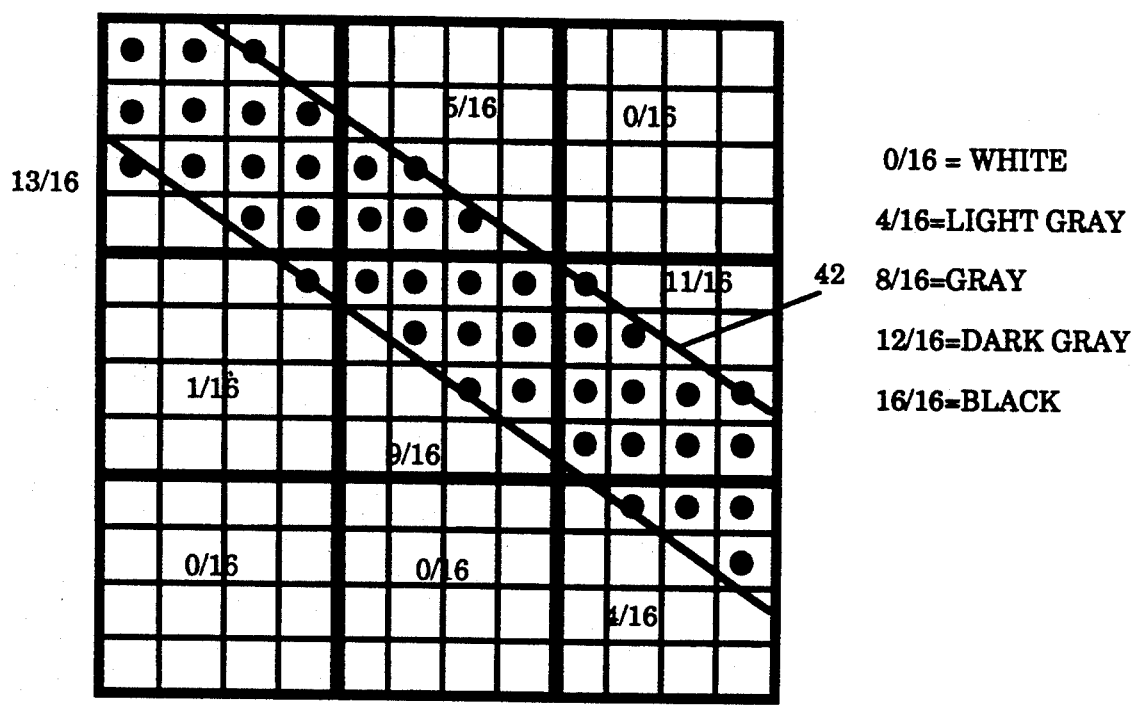
FIG. 4 is a view illustrating a greatly enlarged line described on a bit-mapped computer display using anti-aliasing techniques in a system with which the present invention may be associated.

In the system disclosed, each addressable pixel in the frame buffer memory is logically subdivided into a group of sixteen subpixels so that, as shown in FIG. 4, the entire screen appears to the central processing unit (CPU) as if it had sixteen times more monochrome pixels than it actually has. Thus, each pixel appears to include four times the number of pixels in both the X and the Y directions as are actually present on the output display. This high resolution monochrome data is supplied by the CPU and eventually written to the lower resolution pixel coordinates stored in the frame buffer memory. When performing the mapping between the subpixel coordinates addressed by the CPU and the pixel coordinates stored in memory, the subpixel data (i.e., sixteen bits of information for each pixel to be displayed on the output display) is converted to an appropriate gray scale value so that the anti-aliased line has appropriately shaded pixels at the edges of the line somewhat in the manner shown in FIG. 3(b).

Nine pixels of the frame buffer memory of such an anti-aliasing system are illustrated in FIG. 4. Each one of these pixels is divided into sixteen subpixels. The line 42 which crosses six of the nine pixels shown in FIG. 4 also crosses different groups of the sixteen subpixels representing each pixel. As shown, each subpixel which the line 42 crosses is represented by a dot and is assigned a value of one. These values are totaled, and each pixel is assigned a number representing the total number of subpixels which the line 42 crosses.

For example, the upper leftmost pixel in FIG. 4 (designated as pixel number 1) has thirteen subpixels which are crossed by the line 42. The thirteen subpixels are each assigned a value of one so that the numerical value for pixel number 1 is thirteen. This is thirteen-sixteenths of the total possible value which might be assigned to a pixel. If gray scale values are assigned based on the number of subpixels touched by an image from zero to sixteen representing white to black, then the pixel number 1 would be assigned a gray scale value of a dark gray. Similarly, pixel number 2 which has only five subpixels which are crossed by the line 42 would be assigned a gray scale value related to the five-sixteenths possible value and would be shaded a light gray. The remaining pixels of the line 42 would be appropriately shaded depending on the total number of subpixels of each which the line 42 crosses.

In this manner, the jagged edges of the line 42 are smoothed so that the eye at a distance perceives the variously shaded edges as representing a more linear and less jagged line than would be presented were the pixels all of one shade. Consequently, the line appears to have a resolution approximately four times greater than its actual resolution. In a particular graphics output system using this technique, the screen is capable of providing an actual pixel output of 1152 by 900, and the number of subpixels is 4608 by 3600. Thus, the apparent resolution is four times that of the normal screen or 320 pixels per inch.

As may be understood from the above explanation, the application of anti-aliasing techniques to the computer graphics system disclosed in the above-mentioned patent disclosure makes use of the gray scale capabilities of the system to overcome the tendency to produce jagged lines on the output display. Consequently, the attempt to produce depth cueing by varying the intensity of the images with depth poses a unique problem and could raise a question of interference between techniques.

Moreover, if the graphics system using the improved anti-aliasing technique described above were to provide depth cueing in the conventional manner of prior art in which the intensity value of each of the individual pixels is computed and plotted bit by bit, the entire system would be slowed to approximately one-tenth of its actual speed. This results because the system realizes very high speed in rendering graphics outputs by utilizing a technique in which images are first broken into quadrilaterals, the scan lines defining those quadrilaterals are determined, the two ends of each scan line are ascertained, and the entire scan line is drawn from beginning to end without looking at intervening pixels. Such a system is described in U.S. Pat. applications Ser. No. 07/297,475, HARDWARE IMPLEMENTATION OF CLIPPING AND INTERCOORDINATE COMPARISON LOGIC, Malachowsky and Priem, filed Jan. 13, 1989; Ser. No. 07/297,604, APPARATUS AND METHOD FOR PROCESSING GRAPHICAL INFORMATION TO MINIMIZE PAGE CROSSINGS AND ELIMINATE PROCESSING OF INFORMATION OUTSIDE A PREDETERMINED CLIP, Malachowsky and Priem, filed Jan. 13, 1989; Ser. No. 07/297,093, APPARATUS AND METHOD FOR USING A TEST WINDOW IN A GRAPHICS SUBSYSTEM WHICH INCORPORATE HARDWARE TO PERFORM CLIPPING OF IMAGES, Malachowsky and Priem, filed Jan. 13, 1989; Ser. No. 07/297,590, APPARATUS AND METHOD FOR LOADING COORDINATE REGISTERS FOR WITH A GRAPHICS SUBSYSTEM UTILIZING AN INDEX REGISTER, Malachowsky and Priem, filed Jan. 13, 1989; Ser. No. 07/287,128, METHOD AND APPARATUS FOR DECOMPOSING A QUADRILATERAL FIGURE FOR DISPLAY AND MANIPULATION BY A COMPUTER SYSTEM, Malachowsky, filed Dec. 20, 1988; Ser. No. 07/287,392, METHOD AND APPARATUS FOR SORTING LINE SEGMENTS FOR DISPLAY AND MANIPULATION BY A COMPUTER SYSTEM, Malachowsky and Priem, filed Dec. 20, 1988, and; Ser. No. 07/287,493, METHOD AND APPARATUS FOR TRANSLATING RECTILINEAR INFORMATION INTO SCAN LINE INFORMATION FOR DISPLAY BY A COMPUTER SYSTEM, Malachowsky and Priem; and Ser. No. 07/286,997, METHOD AND APPARATUS FOR DETERMINING LINE POSITIONS FOR DISPLAY AND MANIPULATION BY A COMPUTER SYSTEM, Malachowsky and Priem, filed Dec. 20, 1988, all assigned to the assignee of this invention. Such a system provides very high graphics rendering speeds but obviously argues against the use of a technique for providing depth cueing which would necessitate each individual pixel being determined.

Figure 5:
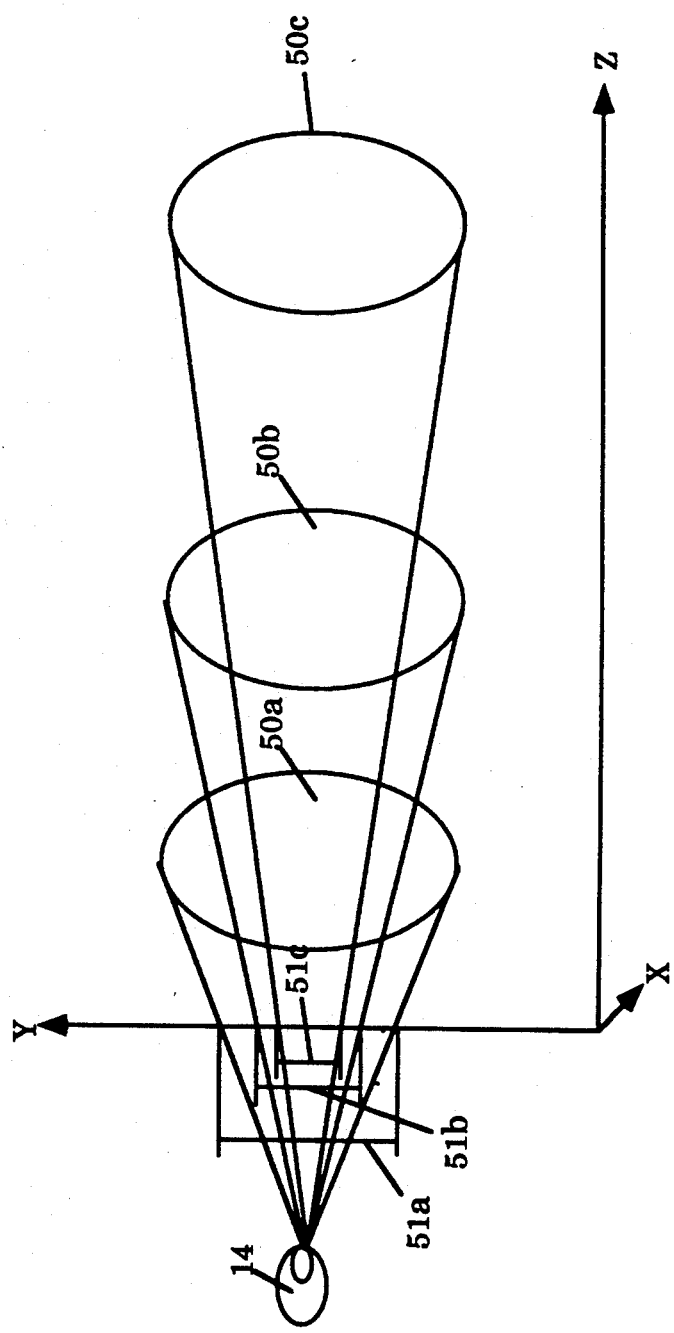
FIG. 5 is a diagram illustating the amounts of a computer output display occupied by an object at three different depths.

Although there would appear to be an apparent conflict between the presentation of anti-aliasing and depth cueing in the same system, the above-described graphics systems is peculiarly adapted to a different form of depth cueing embodied in the present invention. The invention is based on the recognition that as figures progress from the foreground to the background, the width of constant width lines appear to grow narrower. In fact, the apparent width of an object is inversely proportional to the distance of the object from the eye; that is, the apparent width of a constant sized object is related to 1/Z (where Z is the distance from the viewer) as it recedes from view. Consequently, a line on a computer output display may be made to appear to recede into the background by making it narrow as it recedes from the front of the display. This result is demonstrated in FIGS. 5 in which an object 50 is shown at three different depths from the eye 14. It will be recognized that an actual object 50(a) close to the eye 14 subtends a substantially wider portion of the viewing area of the screen (see vertical dimension 51(a)) than does the object 50(b) (see dimension 51(b)) or the object 50(c) (dimension 51(c)).

Thus, it is possible to provide depth cueing in a computer graphics system by rendering objects on the output display so that the width of those objects is inversely proportional to the distance those objects are from the viewer.

Figure 6:
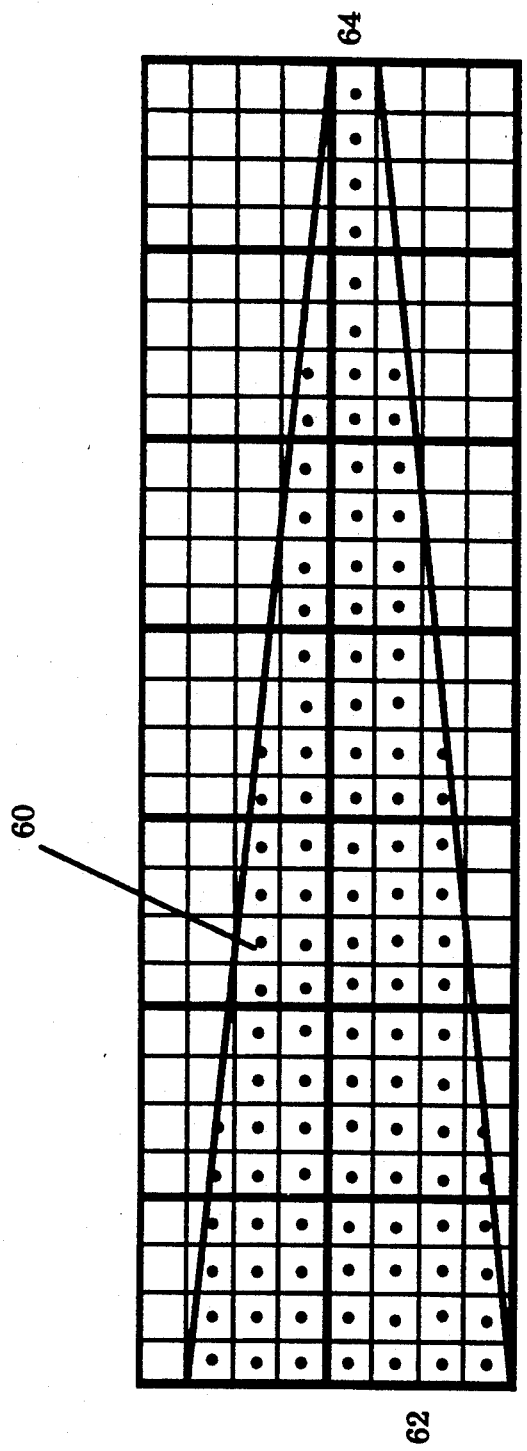
FIG. 6 is a drawing illustrating a line having a width related to the depth of its points in a high resolution mode used with a particular anti-aliasing system.

This rendering the widths of points of lines inversely proportional to their depths may be rapidly accomplished in the graphics system above-described which utilizes subpixels in order to obtain apparent high resolution on an output display. By mapping the line width property in the high resolution mode furnished by the CPU for determining anti-aliasing, a line may be made to have different widths. Thus, for example, where a line is drawn which has a varying Z or depth value, the line may cover an entire pixel at its nearest point and recede to a single subpixel width at its farthest point. Such a line 60 is illustrated in FIG. 6 which shows the high resolution mode of the above-described graphics system broken into subpixel units prior to being written to the frame buffer. The line 60 has a constant width and runs horizontally across the output display while progressively receding from the screen. It may be seen that line 60 has been mapped to cover approximately seven subpixels at an end 62 which is nearer the eye and a single subpixel at an end 64 which is farthest from the eye even though the line 60 is actually of a constant width.

FIG. 6 also demonstrates that the graphics system utilizing the subpixel method of anti-aliasing is especially suited for this technique of depth cueing because, as is shown by the line 60, the anti-aliasing effect is automatically included as the line is drawn. Because the anti-aliasing technique automatically provides that objects receive intensity values which depend upon the number of subpixels covered by the object, the reduction in intensity effect is given to the width of the object as it recedes. Thus, the line 60 has its edges filled by the anti-aliasing technique described above which varies the intensity of individual pixels written to the frame buffer in accordance with the number of subpixels covered by the line 60. Consequently, the line 60 appears darker (and thus wider) at its wider end 62 and lighter (and thus narrower) at its narrow end 64. Consequently, the line 60 would actually be rendered on the display a single pixel wide along its length at intensities which gradually decrease from black (or other foreground color) to a very light gray (or other background color) in a system using the improved anti-aliasing technique descibed above.

Figure 7:
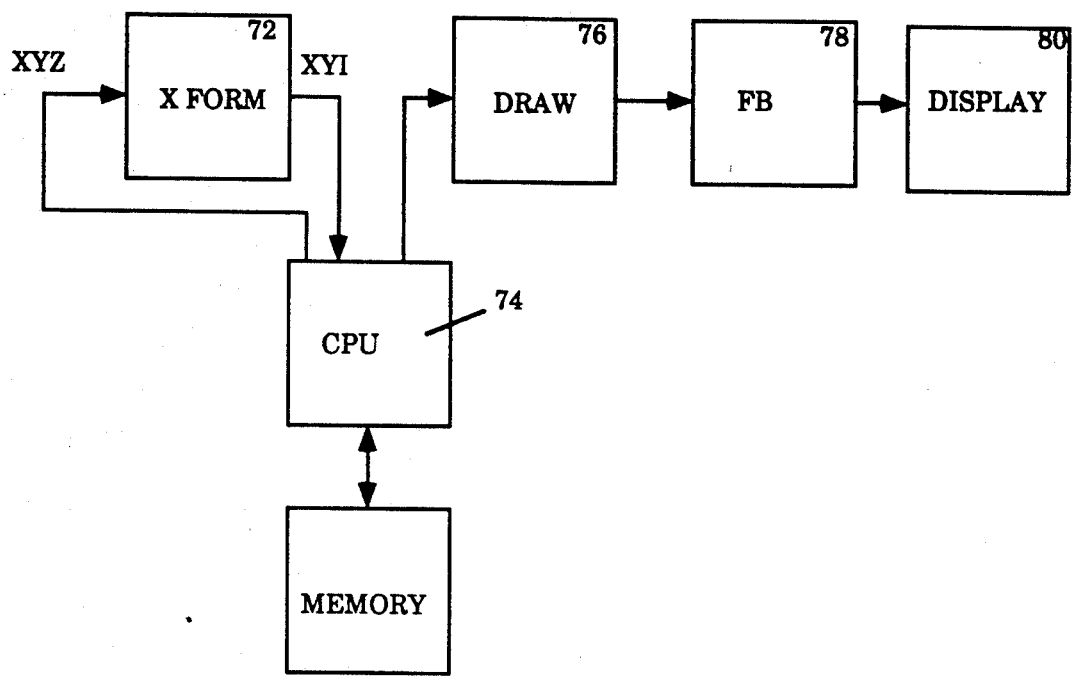
FIG. 7 is a block diagram illustrating a computer graphics system in accordance with the present invention.

FIG. 7 illustrates in block diagram form a computer graphics system 70 utilizing the present invention. The system 70 includes a transformation engine 72, a central processor 74, a line drawing engine 76, a frame buffer 78, and an output display 80 such as a cathode ray tube. The circuitry of all of these individual components may be of a type well known to the prior art although their arrangement is distinct therefrom and comports with the descriptions provided in the above-mentioned copending patent applications. For example, the transformation engine 72 receives as input the X, Y, and Z values of each individual point to be described on the output display 80. The engine 72 utilizes circuitry well known to the prior art to transform the original coordinates of the point by rotation, translation, or scaling to accomplish whatever is to be done to the particular point in moving from output frame to output frame. Normally this provides an output having new X, Y, and Z values.

In the system 70 of the present invention the Z values may be directly utilized to provide values for the widths to be utilized in describing an object. That is, the input Z value is operated on by the transformation engine 72 so that the output gives a new X, Y, and an width value. The new width value is inversely proportional to the Z value which would normally be produced.

The method by which the transformation engine accomplishes the conversion of Z values to width values is an extension of the normal transformation operation. The normal transformation operation applies a four-by-four transform which is the result of concatenating matrices which individually represent the translation, rotation about the desired axes, and scaling transforms to the X, Y, and Z values. In the present invention the four-by-four matrix may be realized by including a transform representing the cueing operation. Such a transform is represented by the concatenation of the standard transformation matrices which may be found in Chapter 22, *Principles of Interactive Computer Graphics*. 2d. Edition, Newman and Sproull, McGraw-Hill Book Co., with a transform representing the cueing operation.

The cueing operation may be termed the Z-to width conversion transform. It is reached using FIG. 7 of the drawing as follows:

$$W = (Wmax - Wmin)*(Zmax - Z)/(Zmax - Zmin) + Wmin$$

where Z is the Z value of a point of interest, Zmin is the Z value of the object closest to the screen, and Zmax is the Z value of object farthest from the screen, Wmax and Wmin are the maximum and minimum values of grey scale levels available.

A particular transform which is a concatenation of equation 22-1 for translation and equation 22-5 for scaling along with the Z-to-W conversion transform from *Principles of Interactive Computer Graphics*, and therefore accomplishes the conversion for translation, scaling, and Z-to-W conversion is:

$$[XYZ1] \begin{vmatrix} 1 & 0 & 0 & 0 \\ 0 & 1 & 0 & 0 \\ 0 & 0 & Zs & 0 \\ 0 & 0 & Zt & 1 \end{vmatrix} = [X'Y'W'1]$$

Where $Zs = -(Wmax - Wmin)/(Zmax - Zmin)$ $Zt = Wmin + Zmax*(Wmax - Wmin)/(Zmax - Zmin)$ In this transform, only the Z values are changed since these are the only values of interest.

Then $W' = Z*Zs + Zt$.

Figure 8:
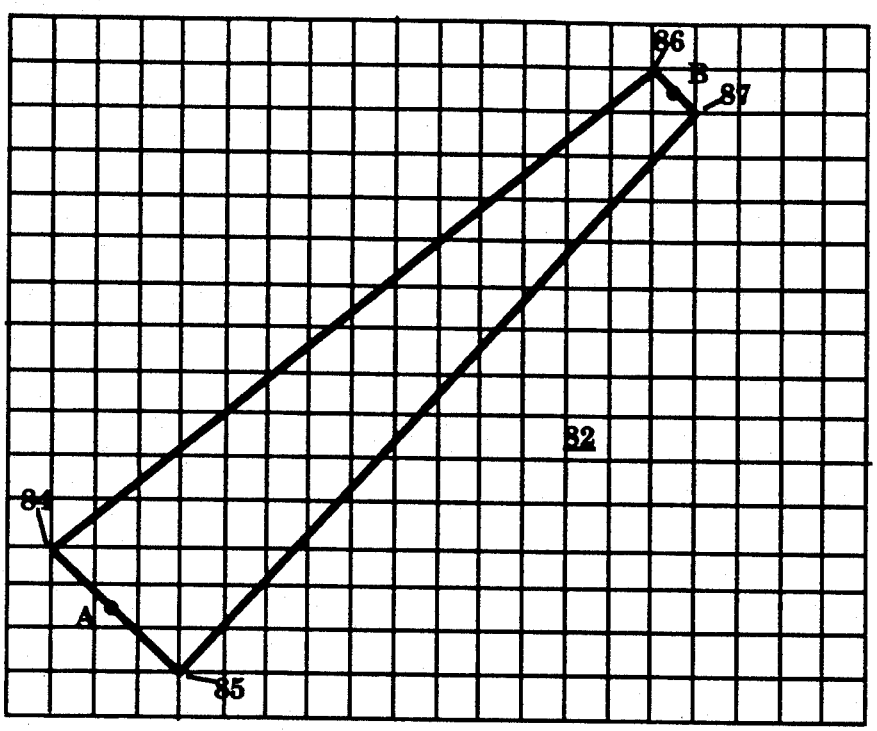
FIG. 8 illustrates a line which is rendered on a display by means of the XY vertex values of four points defining the line.

The values for the widths of the two ends of a line segment to be rendered which are provided by the transformation engine 72 are computed as described above in accordance with properties well known to the prior art. These values are then handed to the CPU 74 which utilizes the widths of the two ends of the line segment to determine the position of the vertices at the two corners at each of the two ends of the line segment. The values of the vertices are computed and transferred to a drawing engine 76. In the preferred embodiment of the invention, the drawing engine 76 describes a line segment by drawing a quadrilateral including the vertices describing the line. FIG. 8 illustrates a line 82 having four such vertices 84-87, each with X and Y values. A drawing engine such as that of the preferred embodiment is described in the above-mentioned copending patent applications. The drawing engine 76 provides the appropriate values to internal anti-aliasing circuitry which operates as explained above and transfers its results to the frame buffer 78 for presentation on the output display 80.

The vertices 84-87 of the line 82 are actually provided to the anti-aliasing circuitry of the system without any variation in intensity. The anti-aliasing portion of the circuitry then causes the variation in intensity in the manner described above and in detail in the co-pending patent application.

Figure 9:
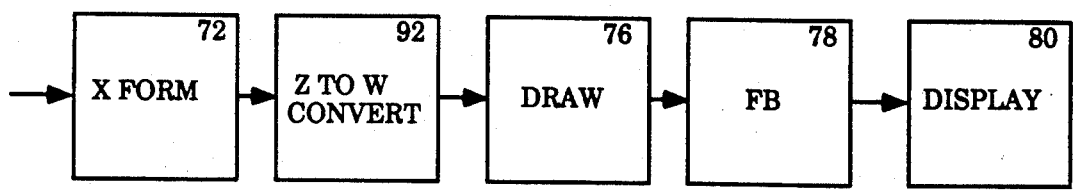
FIG. 9 is a block diagram illustrating a second computer graphics system in accordance with the present invention.

A second system 90 constructed in accordance with the invention is shown in FIG. 9. Such a system may be utilized in situations in which the system CPU does not have direct access to the component elements of the graphics systems, the more usual arrangement. In the system 90, the transformation engine 72 provides transformed X, Y, and Z values for both ends of each line segment in a manner well known to the prior art. Thus, at this point the X and Y values of the center of the ends of each line and the width of the line at each of those points is known. These output values are transferred to a Z-to-width converter 92 which provides output values of the X, Y, and width values for each line segment.

A line running at an angle in two dimensions may have its vertices computed by standard trigonometric operations by first determining one-half the line width at each end and then extending a line at right angles to the center of the line at the particular end of the line of interest. Each vertex values so determined may be transferred to the line drawing engine 76 described above for transfer to the frame buffer 78 and later rendering on the output display 80.

It will be appreciated that such computations of exact values of the vertices at the ends of each line are quite time consuming. In a preferred embodiment of the invention, an arrangement has been devised which obviates the need to accomplish the trigonometric functions normally required to determine the positions of each of the vertices. It has been found that with the anti-aliasing arrangement with which the present invention functions, any line may have its beginning and end drawn at forty-five degrees to horizontal and will still have essentially the same gray scale value as that line would have were its vertices accurately determined using the various trigonometric functions.

Figure 10A:
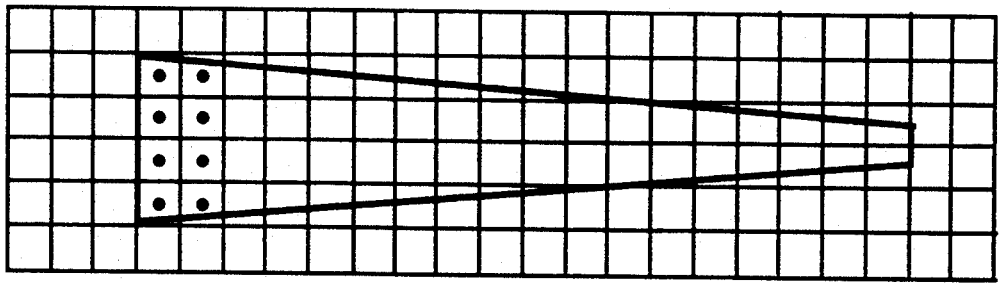
FIG. 10(a) illustrates one particular method for drawing the ends of lines having widths which vary with depth.
Figure 10B:
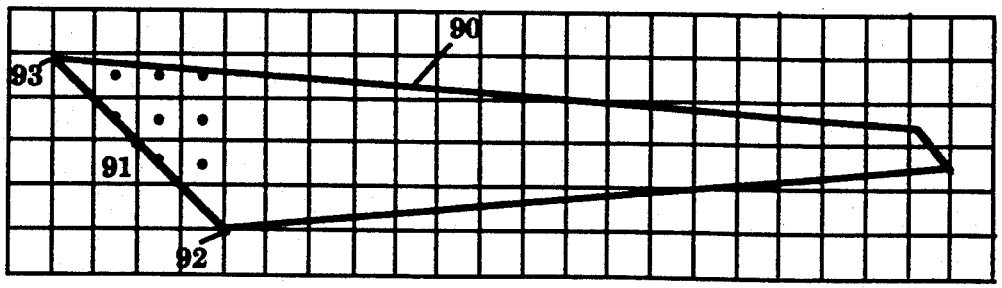
FIG. 10(b) illustrates another method for drawing the ends of lines having widths which vary with depth.

The two lines shown in FIGS. 10(a) and 10(b) illustrate this principle. For example, the line shown in FIG. 10(a) has its vertices drawn accurately while the line in FIG. 10(b) has its vertices drawn at forty-five degree angles to horizontal. Because of the particular anti-aliasing technique using subpixels, counting the number of subpixels which each line covers demonstrates that each covers essentially the same number. Consequently, the intensity of the line is drawn at the same gray scale level if all lines are drawn at forty-five degrees as if they had been accurately determined.

Moreover, when the vertices are computed at forty-five degrees for all lines, the mathematical manipulations are reduced to the trivial. All that is necessary is to, starting at the center point of one end of the line (the point 91 of line 90 in FIG. 10(b)), add one-half the width of the line at that point to the X value and subtract one-half the width from the Y value to obtain point 92 and add one-half the width of the line to the Y value at point 91 and subtract one-half from the X value to obtain the point 93. The angles at 45 degrees to the horizontal may be obtained in an essentially similar manner in all four quadrants by variously adding and subtracting one-half the width of the line to the central X and Y values. This substantially reduces the time required to compute the vertices when the width of the line at its ends is known and substantially speeds the operation of the system.

Another substantial advantage of the arrangement is that when lines are joined to other lines as is almost always the case, the two lines at forty-five degrees to the horizontal join accurately without overlap. In the system of the preferred embodiment, this means that the pixels at the points of joinder are only drawn a single time rather than twice as would be the case with accurately computed lines.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer graphic display system for rendering three dimensional (3-D) graphic images comprising a plurality of line segments on a two dimensional (2-D) display device, said system comprising:

input means for receiving a first and a second X-Y coordinate value and a first and a second depth value for a first and a second end point of a line segment, said first and second X-Y coordinate values identifying a first and a second pixel of said display device, said first and second depth values identifying a first and a second orthogonal distance from said first and second end points to a viewer plane which parallels said display device;

width determining means coupled to the input means for generating a first and a second width value for a first and a second side of a quadrilateral representing said line segment according to said first and second depth values, said first and second sides corresponding to said first and second ends of said line segment;

vertices determining means coupled to said input and width determining means for generating a third, a fourth, a fifth and a sixth X-Y coordinate value for a first, a second, a third and a fourth vertex of said quadrilateral, said third and fourth X-Y coordinates identifying a first and a second logical sub-pixel of said first pixel, said fifth and sixth X-Y coordinates identifying a first and second logical sub-pixel of said second pixel, said third and fourth vertices being defined by said first side, said fifth and sixth vertices being defined by said second side, each of said pixels having a plurality of corresponding logical sub-pixels;

quadrilateral rendering means coupled to said vertices determining means for generating pixel data for a plurality of pixels representative of said quadrilateral including said first and second pixels, said pixel data being generated according to said X-Y coordinates of said vertices;

output means coupled to said quadrilateral rendering means for illuminating said pixels according to said pixel data whereby rendering said quadrilateral on said 2-D display device representing said 3-D line segment in a manner such that said viewer perceives said first and second orthogonal distances.

2. The computer graphic display system as set forth in claim 1, wherein each of said logical sub-pixels is logically enabled if said logical sub-pixel intersects substantially with said quadrilateral;

each of said pixel data indicates an illumination intensity proportional to the pixel's logical sub-pixels enabled.

3. The computer graphic display system as set forth in claim 1 wherein said first and second width values are inversely proportional to said first and second depth values respectively.

4. The computer graphic display system as set forth in claim 1 wherein said first and second width values are determined according to the following:

$$W = (W\max - W\min)*(Z\max - Z)/(Z\max - Z\min) + W\min$$

where W is a selected one of said first and second width values, Z is a selected one of said first and second depth values, Zmin and Zmax are constants identifying respectively the closest and the furthest distances from the viewer, and Wmax and Wmin are constants identifying respectively the maximum and minimum values of intensities available.

5. The computer graphic display system as set forth in claim 1, wherein said vertices determining means generates said vertices of the quadrilateral assuming said first and second sides to be 45° inclined, said third X-Y coordinate being generated by subtracting one-half of said first width value from the x-coordinate and adding one-half of said first width value to the y-coordinate of said first X-Y coordinate;

said fourth X-Y coordinate being generated by adding one-half of said first width value to the x-coordinate and subtracting one-half of said first width value from the y-coordinate of said first X-Y coordinate;

said fifth X-Y coordinate being generated by subtracting one-half of said second width value from the x-coordinate and adding one-half of said second width value to the y-coordinate of said second X-Y coordinate;

said sixth X-Y coordinate being generated by adding one-half of said second width value to the x-coordinate and subtracting one-half of said second width value from the y-coordinate of said second X-Y coordinate.

6. The computer graphic display system as set forth in claim 1, wherein said quadrilateral means further comprises anti-aliase means for modifying said pixel data to provide anti-aliasing for said line segment.

7. The computer graphic display system as set forth in claim 6, wherein said anti-aliase means modifies said enabling of said logical sub-pixels to provide anti-aliasing for said line segment.

8. A computer graphic display system for rendering three dimensional (3-D) graphic images on a two dimensional (2-D) display device, said system comprising:

input means for receiving a first and a second X-Y coordinate value and a first and a second depth value for a first and a second end point of a line segment, said first and second X-Y coordinate values identifying a first and a second pixel of said display device, said first and second depth values identifying a first and a second orthogonal distance from said first and second end points to a viewer plane which parallels said display device;

width determining means coupled to the input means for generating a first and a second width value for a first and a second side of a quadrilateral representing said line segment according to said first and second depth values, said first and second sides corresponding to said first and second ends of said line segment;

vertices determining means coupled to said input and width determining means for generating a third, a fourth, a fifth and a sixth X-Y coordinate value for a first, a second, a third and a fourth vertex of said quadrilateral, said third and forth X-Y coordinates identifying a first and a second logical sub-pixel of said first pixel, said fifth and sixth X-Y coordinates identifying a first and a second logical sub-pixel of said second pixel, said third and fourth vertices being defined by said first side, said fifth and sixth vertices being defined by said second side, each of said pixels having a plurality of corresponding logical sub-pixels;

quadrilateral rendering means coupled to said vertices determining means for generating pixel data for a plurality of pixels representative of said quadrilateral including said first and second pixels, said pixel data being generated according to said X-Y coordinate values of said vertices;

anti-aliase means coupled to said quadrilateral means for modifying said pixel data to provide anti-aliase for said line segments; and output means coupled to said anti-aliase means for illuminating said pixels according to said pixel data whereby rendering said quadrilateral on said 2-D display device representing said anti-aliased 3-D line segment in a manner such that said viewer perceives said first and second orthogonal distances.

9. The computer graphic display system as set forth in claim 8, wherein:

each of said logical sub-pixels is logically enabled if it intersects substantially with said quadrilateral; and said anti-aliase means selectively modifies said enabling of said logical sub-pixels to provide anti-aliasing for said line segment.

10. The computer graphic display system as set forth in claim 9, wherein each of said pixel data indicates an illumination intensity proportional to the pixel's logical sub-pixels enabled.

11. The computer graphic display system as set forth in claim 8 wherein said first and second width values are inversely proportional to said first and second depth values respectively.

12. The computer graphic display system as set forth in claim 8 wherein said first and second width values are determined according to the following:

$$W = (Wmax - Wmin)*(Zmax - Z)/(Zmax - Zmin) + Wmin$$

where W is a selected one of said first and second width values, Z is a selected one of said first and second depth values Zmin and Zmax are constants identifying respectively the closest and furthest distances from the viewer, and Wmax and Wmin are constants identifying respectively the maximum and minimum values of intensities available.

13. The computer graphic display system as set forth in claim 8, wherein said vertices determining means generates said vertices of the quadrilateral assuming said first and second sides to be 45° inclined;

said third X-Y coordinate being generated by subtracting one-half of said first width value from the x-coordinate and adding one-half of said first width value to the y-coordinate of said first X-Y coordinate;

said fourth X-Y coordinate being generated by adding one-half of said width value to the x-coordinate and subtracting one-half of said first width value from the y-coordinate of said first X-Y coordinate;

said fifth X-Y coordinate being generated by subtracting one-half of said second width value from the x-coordinate and adding one-half of said second width value to the y-coordinate of said second X-Y coordinate;

said sixth X-Y coordinate being generated by adding one-half of said second width value to the x-coordinate and subtracting one-half of said second width value from the y-coordinate of said second X-Y coordinate;

14. In a computer graphic display system for rendering three dimensional (3-D) graphic images comprising a plurality of line segments on a two dimensional (2-D) display device, a method for providing depth cueing comprising the steps of:

receiving a first and a second X-Y coordinate value and a first and a second depth value for a first and a second end point of a line segment, said first and second X-Y coordinate values identifying a first and a second pixel of said display device, said first and second depth values identifying a first and a second orthogonal distance from said first and second end points to a viewer plane which parallels said display device;

determining a first and a second width value for a first and a second side of a quadrilateral representing said line segment according to said first and second depth values, said first and second sides corresponding to said first and second line segments;

determining a third, a fourth, a fifth and a sixth X-Y coordinate value for a first, a second, a third and a fourth vertex of said quadrilateral, said third and fourth X-Y coordinates identifying a first and a second logical sub-pixel of said first pixel, said fifth and sixth X-Y coordinates identifying a first and a second logical sub-pixel of said second pixel, said third and fourth vertices being defined by said first side, said fifth and sixth vertices being defined by said second side, each of said pixels having a plurality of corresponding logical sub-pixels;

generating pixel data for a plurality of pixels representative of said quadrilateral including said first and second pixels, said pixel data being generated according to said X-Y coordinates of said vertices; and illuminating said pixels according to said pixel data whereby rendering said quadrilateral on said 2-D display device representing said 3-D line segment in a manner such that said viewer substantially perceives said first and second orthogonal distances.

15. The method for providing depth cueing as set forth in claim 14, wherein each of said logical sub-pixels is logically enabled if said logical subpixel intersects substantially with said quadrilateral;

each of said pixel data indicates as illumination intensity proportional to the pixel's logical sub-pixels enabled.

16. The method for providing depth cueing as set forth in claim 14, wherein said first and second width values are inversely proportional to said first and second depth values respectively.

17. The method for providing depth cueing as set forth in claim 14, wherein said first and second width values are determined according to the following:

$$W = (Wmax - Wmin)*(Zmax - Z)/(Zmax - Zmin) + Wmin$$

where W is a selected one of said first and second width values, Z is a selected one of said first and second depth values Zmin and Zmax are constants identifying respectively the closest and the furthest distances from the viewer, and Wmax and Wmin are constants identifying respectively the maximum and minimum values of intensities available.

18. The method for providing depth cueing as set forth in claim 14, wherein said vertices of the quadrilateral are determined assuming said first and second sides to be 45° inclined said third X-Y coordinate being generated by subtracting one-half of said first width value from the x-coordinate and adding one-half of said first width value to the y-coordinate of said first X-Y coordinate;

said fourth X-Y coordinate being generated by adding one-half of said first width value to the x-coordinate and subtracting one-half of said first width value from the y-coordinate of said first X-Y coordinate;

said fifth X-Y coordinate being generated by subtracting one-half of said second width value from the x-coordinate and adding one-half of said second width value to the y-coordinate of said second X-Y coordinate;

said sixth X-Y coordinate being generated by adding one-half of said second width value to the x-coordinate and subtracting one-half of said second width value from the y-coordinate of said second X-Y coordinate.

19. The method for providing depth cueing as set forth in claim 14, wherein said step of generating said pixel data further comprises modifying said pixel data to provide anti-aliasing for said line segment.

20. The computer graphic display system as set forth in claim 14, wherein said modification of said pixel data comprises modifying said enabling of said logical sub-pixels.

* * * * *

UNITED STATES PATENT AND TRADEMARK OFFICE
CERTIFICATE OF CORRECTION

PATENT NO. : 5,237,650
DATED : 8/17/93
INVENTOR(S) : Priem, et al.

It is certified that error appears in the above-identified patent and that said Letters Patent is hereby corrected as shown below:

In Column 11, line 35, please delete "third and fourth" and insert in lieu thereof --first and second--

In Column 11, lines 36 and 37, please delete "fifth and sixth" and insert in lieu thereof --third and fourth--

In Column 12, line 68, please delete "third and fourth" and insert in lieu thereof --first and second--

In Column 13, line 1, please delete "fifth and sixth" and insert in lieu thereof --third and fourth--

In Column 14, line 31, please delete "third and fourth" and insert in lieu thereof --first and second--

In Column 14, line 32, please delete "fifth and sixth" and insert in lieu thereof --third and fourth--

Signed and Sealed this

Tenth Day of May, 1994

*Attest:*

BRUCE LEHMAN

*Attesting Officer*     Commissioner of Patents and Trademarks